United States Patent [19]

Fleck

[11] 4,125,597
[45] Nov. 14, 1978

[54] METHOD OF REMOVING HYDROGEN SULFIDE FROM GAS

[75] Inventor: Raymond N. Fleck, West Covina, Calif.

[73] Assignee: Union Oil Company of California, Brea, Calif.

[21] Appl. No.: 654,996

[22] Filed: Feb. 4, 1976

[51] Int. Cl.² ............................................. C01B 17/04
[52] U.S. Cl. .................................................. 423/573 R
[58] Field of Search .......................... 423/571, 573, 226

[56] References Cited

U.S. PATENT DOCUMENTS

| 3,097,926 | 7/1963 | Nicklin et al. | 423/573 |
| 3,642,448 | 2/1972 | Beavon | 423/573 X |
| 3,752,877 | 8/1973 | Beavon | 423/573 |

FOREIGN PATENT DOCUMENTS

| 948,270 | 1/1964 | United Kingdom | 423/226 |

OTHER PUBLICATIONS

Heil Process Equipment Corp., Bulletin B-770; Cleveland, Ohio, 1969.

*Primary Examiner*—G. O. Peters
*Attorney, Agent, or Firm*—Richard C. Hartman; Dean Sandford

[57] ABSTRACT

The process for absorbing hydrogen sulfide from hydrogenated or hydrolyzed Claus process gas by contacting said gas and an alkaline aqueous solution containing dissolved oxidation-reduction components in at least a primary and a final gas-liquid scrubber stage to effect the absorption of the hydrogen sulfide from the gas. The hydrogen sulfide is subsequently oxidized to elemental sulfur in the washing solution. The fresh washing solution is first introduced to the final stage for contact with gas of reduced hydrogen sulfide content from the prior stages to effect the transfer of dissolved and entrained oxygen from the washing solution to the gas. The thus treated washing solution is then passed to at least the primary scrubber stage for contact with incoming hydrogen sulfide rich gas under conditions which avoid a high rate of thiosulfate and sulfate formation due to the presence of oxygen. The washing solution is thereafter regenerated by contact with an oxygen-containing gas and the elemental sulfur is recovered therefrom.

10 Claims, 1 Drawing Figure

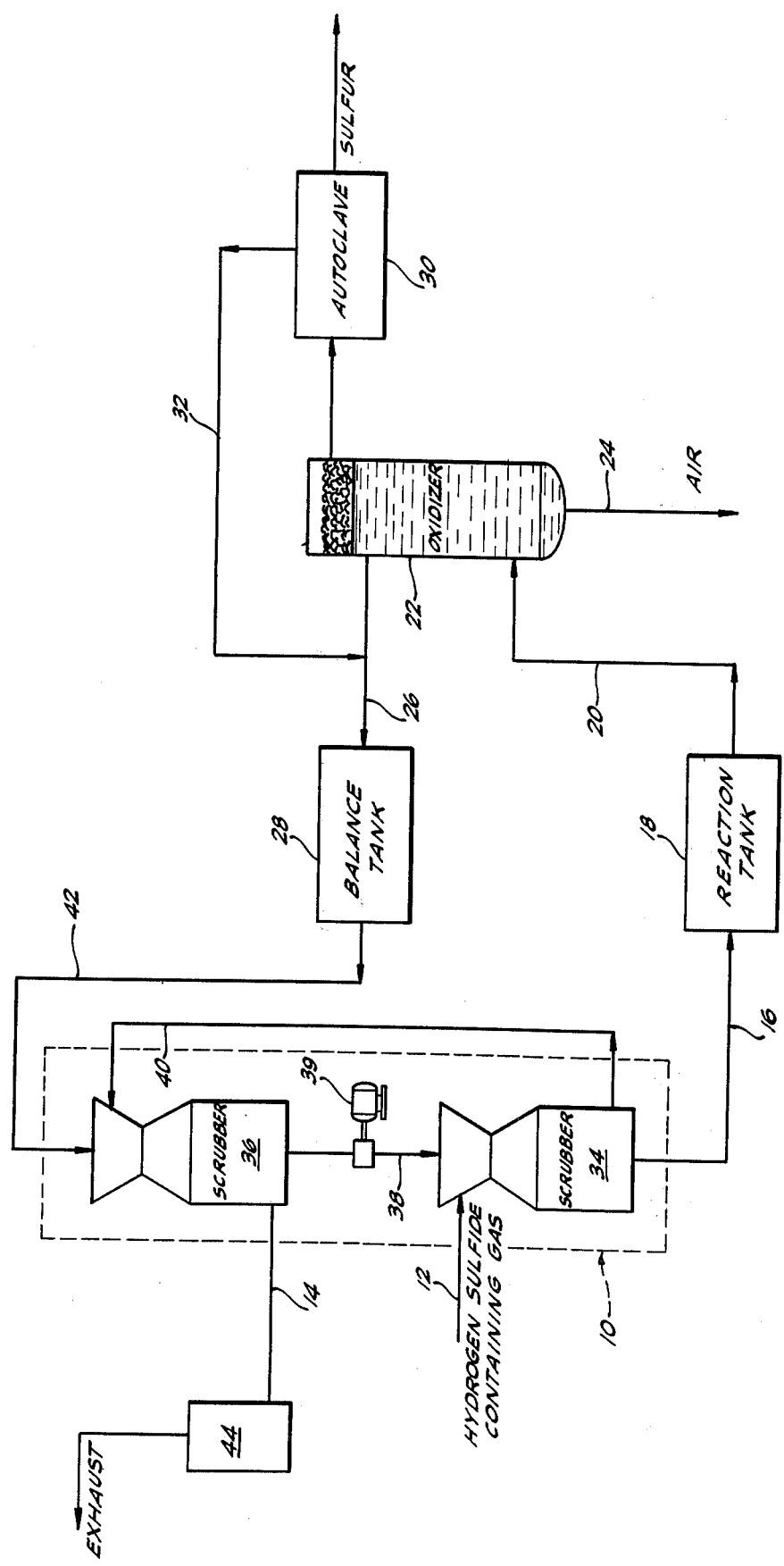

METHOD OF REMOVING HYDROGEN SULFIDE FROM GAS

FIELD OF THE INVENTION

This invention relates to the removal of hydrogen sulfide from gases and more particularly to a process for removing hydrogen sulfide from hydrogenated or hydrolyzed Claus process gas in which the hydrogen sulfide is converted to elemental sulfur.

DESCRIPTION OF THE PRIOR ART

With the increasing concern for the pollution of the atmosphere, great demands have been made on industry to produce pollution-free products and to do so in a pollution-free manner. One area of particular concern has been the release of sulfur and its compounds into the atmosphere in the refining of petroleum, the sweetening of sour natural gas, the processing of ore, the destructive distillation of coal, and in other processes which produce sulfur-containing gases.

The Claus process, which is widely employed for the desulfurization of hydrogen sulfide-containing gases, is highly effective in converting relatively concentrated hydrogen sulfide to elemental sulfur. While substantial amounts of sulfur are recovered and, thus, prevented from being released into the atmosphere, in many instances it is necessary to further treat the Claus process tail gas to make it acceptable for discharge into the atmosphere. One process particularly useful for treating these water-containing tail gases is the Beavon sulfur removal process described in U.S. Pat. No. 3,752,877, which process involves the catalytic hydrogenation and hydrolyzation of the various sulfur compounds of the Claus process tail gas to convert them to hydrogen sulfide, and then employing a process, known as the Stretford process, to remove the thus formed hydrogen sulfide. The Stretford process is a well-known process for converting hydrogen sulfide to elemental sulfur and is described in U.S. Pat. Nos. 2,997,439, 3,035,889, and 3,097,926.

In the Stretford process, the hydrogen sulfide-containing gas is contacted with an alkaline, vanadium containing washing solution to effect the formation of elemental sulfur from the gas. This contact is normally carried out in a large packed tower, with the gas flowing upwardly through the tower countercurrently to the washing solution.

In operating the Stretford process on a commercial scale, the tower may exceed 150 feet in height and 12 feet in diameter in order to provide sufficient contact between the gas and the washing solution. Towers of this size are expensive to construct and maintain. In addition, packed towers are often plagued by hard deposits of sulfur which, for reasons not fully understood, form in fthe tower packing. These deposits, if allowed to accumulate, can lead to reduction of process efficiency and eventual plugging of the tower. Accordingly, it is necessary at relatively frequent intervals to take the tower off stream for removal of these sulfur deposits.

Recognizing the foregoing deficiencies of packed towers in the Stretford process, attempts have been made to utilize other means to effect contact between the gas and the washing solution. Thus, for example, cocurrent scrubbers of the venturi type have been utilized in some installations in place of the packed tower. Depending on the size of the installation, a single scrubber unit has been used while other installations employ several scrubbers in parallel. It has also been proposed to use two venturi scrubbers which are connected for series flow of the gas therethrough while the washing solution is split into two streams for parallel flow through the scrubbers.

However, venturi scrubbers have not been totally successful in the Stretford process because of excessive rate of buildup of thiosulfate and sulfate salts in the washing solution. This appears to be due to the immediate contact between oxygen rich washing solution and hydrogen sulfide rich gas which occurs in the venturi scrubber, but not in a packed tower.

Thiosulfate and sulfate salts, which are also formed in the conventional Stretford process using a packed tower but at a lower rate, result in the consumption of base and the excessive formation of total dissolved solids in the washing solution. This necessitates the use of additional base over ordinary requirements and requires that the washing solution be bled to remove the dissolved solids at more frequent intervals than with the conventional Stretford process. This substantially increases operating costs.

SUMMARY OF THE INVENTION

In accordance with the present invention contact between the hydrogen sulfide-containing gas and the washing solution is carried out in at least two steps or stages for effecting cocurrent contact between the gas and the washing solution to absorb the hydrogen sulfide of the gas. Following the staged contact, the washing solution is permitted to reside in a reaction tank to complete the formation of elemental sulfur and is then oxidized to regenerate the washing solution in accordance with the conventional Stretford process. The sulfur is separated from the bulk of the washing solution and is filtered, autoclaved or both to remove traces of the washing solution.

More particularly the absorption of hydrogen sulfide is carried out in at least two cocurrent scrubber units which are series connected, each unit defining a stage in the absorption process. The hydrogen sulfide rich gas is introduced to a scrubber unit defining a first or primary stage for cocurrent flow through the unit with washing solution from which oxygen has been stripped for absorption of hydrogen sulfide in accordance with the Stretford process and the gas is passed sequentially through one or more subsequent stages for absorption of hydrogen sulfide remaining in the gas after the primary stage and exits as clean gas after the final stage. The washing solution is introduced in a scrubber unit defining a final stage for contact with a gas having little or no hydrogen sulfide content to strip oxygen from the solution. While flow of the washing solution and the gas is cocurrent through each scrubber unit, the sequence of the stages through which the gas passes is counter to the sequence of stages for the washing solution.

In this fashion, the rate of formation of thiosulfate and sulfate salts is maintained at a minimum while the necessity of utilizing a large packed tower for hydrogen sulfide absorption is avoided. In an embodiment of the invention, a small packed tower may be utilized after the scrubbers to remove minor amounts of hydrogen sulfide (1 ppm and less) remaining in the gas.

Other features and advantages of the invention will become apparent from the following detailed description and accompanying drawing.

BRIEF DESCRIPTION OF THE DRAWING

The invention will be more readily understood by reference to the accompanying drawing which is a schematic flow diagram of a hydrogen sulfide removal process illustrating the manner in which a hydrogen sulfide-containing feed gas is treated to convert hydrogen sulfide to elemental sulfur.

DETAILED DESCRIPTION

The Stretford process is used to treat hydrogenated and hydrolyzed Claus process tail gas by contacting the tail gas with an aqueous alkaline washing solution to produce an effluent gas of reduced sulfur content and to yield elemental sulfur; the solution is thereafter regenerated by contact with an oxygen-containing gas; the elemental sulfur is recovered from said solution; and the regenerated solution is recycled to the tail gas-contacting step.

The washing solution used in this process is an aqueous solution which has been made alkaline to a pH of above 7, and preferably between about 8.5 and 9.5, by the addition of alkalis such as caustic soda, caustic potash, ammonia; or sodium, potassium, or ammonium carbonates or bicarbonates; or organic bases such as alkanolamines. The preferred alkalis are sodium carbonate and bicarbonate, with sodium carbonate being the most preferred. A mixture of sodium carbonate and bicarbonate may also be used, such as a mixture of about 1 to 8 grams per liter sodium carbonate with about 10 to 30 grams per liter of sodium bicarbonate.

For the purpose of description it will be assumed that the alkali is a mixture of sodium carbonate and bicarbonate although it will be evident that the process is not so restricted. In any event, the $CO_2$ content of the Claus process gas brings the alkali to a ratio of carbonate to bicarbonate characteristic of the partial pressure of the $CO_2$ in the gas.

The solution further contains vanadium in a water-soluble form such as the metal or ammonium vanadates, including sodium metavanadate, sodium orthovanadate, sodium pyrovanadate, sodium ammonium vanadate or isopolyvanadate, or ammonium vanadate; with sodium metavanadate being preferred. The concentration of vanadium in the solution, calculated as the metal, should be no more than about 10 grams per liter, with the preferred range being 0.3 to 6 grams per liter; the optimum concentration depending on the volumetric flow rate of the gas and of the solution and the concentration of hydrogen sulfide in the gas being treated.

The vanadium is reduced in the formation of elemental sulfur as will be described in more detail below. Regeneration of the washing solution comprises oxidizing the vanadium for subsequent reduction reactions.

The solution may also contain additives, such as for example anthraquinone disulfonate (ADA), particularly the disodium salt to facilitate the oxidation of vanadium during regeneration of the washing solution. All the known isomers of ADA are suitable for use in this process. Also, mixtures of the isomers may be used with advantage, including commercially available mixtures which contain 1,5/1,8, 1,6/1,7, or 2,6/2,7 ADA and possibly small quantities of other isomers. Isomers 2,6 and 2,7 have a higher reactivity with sulfide and are preferred; but since the 2,7 isomer is more soluble in water, it is the most preferred material. The concentration of ADA in the solution, calculated as the disodium salt, can be as high as 6 grams per liter, but more preferably ranges from about 0.3 to 3 grams per liter, and most preferably about 2.5 grams per liter. Throughout this description, the concentration of ADA will be given in terms of the disodium salt.

Referring to the drawing, there is illustrated the operation of the Stretford process wherein hydrogenated or hydrolyzed Claus process tail gas containing hydrogen sulfide enters the absorption section of the process, shown generally as 10, through a line 12. While in the absorption section 10 the gas is contacted with the washing solution in the manner to be described hereinafter to effect absorption of the hydrogen sulfide. Clean gas which is substantially reduced in hydrogen sulfide content exits through a line 14. The incoming gas typically contains about 1–3 mole percent hydrogen sulfide; about 2–20 mole percent carbon dioxide; traces of methane, water, carbonyl sulfide, carbon disulfide, elemental sulfur, carbon monoxide, methyl mercaptan, and the remainder nitrogen.

In accordance with the process, sodium carbonate reacts with the hydrogen sulfide to form sodium hydrosulfide:

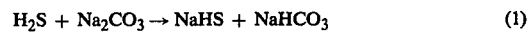
$$H_2S + Na_2CO_3 \rightarrow NaHS + NaHCO_3 \qquad (1)$$

The hydrosulfide is oxidized to elemental sulfur by the water-soluble metal vanadate:

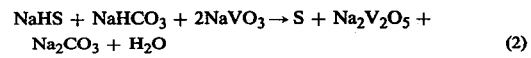
$$NaHS + NaHCO_3 + 2NaVO_3 \rightarrow S + Na_2V_2O_5 + Na_2CO_3 + H_2O \qquad (2)$$

The washing solution then exits the absorber section 10 through a line 16 and enters a reaction tank 18 where it is held to complete the conversion of hydrogen sulfide to elemental sulfur. The residence time in the reaction tank 18 typically varies between 10 and 15 minutes.

The sulfur-containing solution then exits the reaction tank 18 and by means of a line 20 enters near the bottom of an oxidizer vessel 22. Air or oxygen is admitted at the bottom of the oxidizer vessel 22 through a line 24 from a source not shown and is churned into small bubbles by a submerged, rotating stirrer-mixer (not shown) located above the air inlet. The vanadate component of the solution, which was chemically reduced to the quadravalent state in the absorber section 10 and the reaction tank 18, is now regenerated to its initial pentavalent state; facilitated by the ADA:

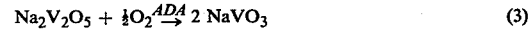
$$Na_2V_2O_5 + \tfrac{1}{2}O_2 \xrightarrow{ADA} 2\,NaVO_3 \qquad (3)$$

The solution then flows through a line 26 to a balance tank 28 from where it is ready to be recycled. Elemental sulfur appears as a froth at the top of the oxidizer vessel 22, from where it is skimmed off, and then flowed to an autoclave 30. The autoclave 30 produces molten sulfur as a product and the recovered washing solution is led through a line 32 back to the line 26 and to the balance tank 28 for recycling.

The absorption of the hydrogen sulfide in the absorption phase 10 occurs rapidly and the conversion of the hydrogen sulfide to elemental sulfur according to reaction (1) initiates in the absorption section 10. A portion of the elemental sulfur present in the washing solution in absorption section 10 may form a deposit on the interior surfaces of vessels used in carrying out the absorption and, in the case of conventional packed towers, may result in a partial or complete plugging of the tower.

During the operation of the Stretford process, thiosulfate and sulfate are formed in the washing solution necessitating periodic bleed-off of the washing solution to remove a portion of the thiosulfate and sulfate. Thiosulfate and sulfate formation is normally considered deleterious in the Stretford process not only because of the required periodic bleed-off which results in loss of chemicals and presents disposal problems because of the high chemical oxygen demand of thiosulfate. In addition thiosulfate and sulfate formation involves consumption of base and reduces the sulfur yield.

Sodium thiosulfate is believed to be formed in two principal ways. First, some HS ions are not converted to elemental sulfur and these ions may form thiosulfate according to the following reaction:

$$Na^+ + H\overline{S} \rightarrow NaSH \qquad (4)$$

$$NaHS + 2O_2 \rightarrow Na_2S_2O_3 + H_2O \qquad (5)$$

Secondly some of the sulfur may form soluble polysulfides (principally in the autoclave 30) according to the reaction:

$$nS° + NaHS \rightarrow NaHS_{m+1} \qquad (6)$$

The polysulfides can react with oxygen to form sodium thiosulfate.

The presence of sulfate in the washing solution is also believed to result in loss of base. It is not presently known whether the sulfate is formed from the thiosulfate or directly from NaHS. In either case the sulfate is formed by reaction with oxygen.

Although other reactions forming thiosulfate and sulfate in the washing solution may also occur during operation of the process, the foregoing are of primary concern and it will be seen that the presence of oxygen in the solution is undesirable from the standpoint of thiosulfate and sulfate formation.

Regeneration of the solution occurs by the contact of oxygen, or preferably air, with the reduced vanadium in the solution. Accordingly freshly regenerated solution contains a substantial proportion of entrained or dissolved oxygen thus favoring the formation of thiosulfate and sulfate when contact between the regenerated solution and the gas is effected.

As utilized by the prior art, cocurrent scrubbers, particularly of the venturi type, have not been completely successful because of the contact between the freshly regenerated solution and hydrogen sulfide rich gas upon introduction into the scrubber for cocurrent flow therethrough. The oxygen present in the regenerated washing solution provides the conditions that favor a high rate of thiosulfate formation when in contact with the hydrogen sulfide rich gas.

It has been found that cocurrent scrubbers can be utilized in the absorption phase of the Stretford process without a high rate of thiosulfate formation when two or more scrubbers are connected in series and the absorption operation is carried out in stages. In accordance with the present invention hydrogen sulfide rich gas is led into a first stage venturi scrubber where contact occurs with a low oxygen content washing solution which has passed through a subsequent stage scrubber. Freshly regenerated washing solution is led into a final stage scrubber for contact with the feed gas from which a substantial proportion of its hydrogen sulfide content has been removed in the prior absorption stage and a substantial proportion of its entrained and dissolved oxygen is stripped from the solution and exits the process with the clean feed gas.

Referring again to the drawing, the absorption section 10 includes a first or primary stage scrubber 34 which is connected to the source of hydrogen sulfide rich gas by the line 12 and a source of washing solution from a scrubber 36 by a line 38. The lines 12 and 38 enter the primary stage scrubber 23 adjacent the upper portion thereof and the flow of gas and solution is cocurrent through the scrubber.

The washing solution exits the first stage scrubber 34 via the line 16 and is led to the reaction tank 18 to complete the reaction of the absorbed hydrogen sulfide to elemental sulfur in accordance with the Stretford process.

The feed gas, having a major portion of its hydrogen sulfide content removed, is led by a line 40 to the scrubber 36 which is the final stage. Freshly regenerated washing solution, containing entrained and dissolved oxygen from the regeneration process in the oxidizer 22, is led from the balance tank 28 through a line 42 to the final stage scrubber 36 for cocurrent flow therethrough in contact with the hydrogen sulfide lean gas from the primary stage scrubber 34. During flow through the final stage scrubber 36, entrained and dissolved oxygen separates from the washing solution and exits with the clean gas through the line 14. The washing solution is pumped by a pump 39 to the first stage scrubber 34 through the line 38.

In the operation of the process, the incoming Claus process gas enters the first stage scrubber 34 having a typical hydrogen sulfide content of about 1 mole % and exits the first stage as lean gas having a hydrogen sulfide content of about 10 ppm. The regenerated washing solution enters the final stage scrubber 36 having a variable amount of entrained air and about 10 ppm of dissolved oxygen. In contact with the essentially hydrogen sulfide free lean gas, the entrained air and dissolved oxygen are transferred to the gas phase. In addition some absorption of hydrogen sulfide also occurs and the clean gas exits the final stage scrubber 36 having a typical hydrogen sulfide content of on the order of 1 ppm.

Although elemental sulfur begins to form in the final stage scrubber 36, the hydrogen sulfide content of the gas is sufficiently low that very little, if any, thiosulfate will be formed and the transfer of the entrained air and dissolved oxygen to the gas phase will predominate over thiosulfate formation.

The stripped washing solution entering the primary stage scrubber 34 is in a condition to efficiently oxidize the hydrogen sulfide under conditions which do not favor the formation of thiosulfate. Accordingly, the rate of thiosulfate formation in the process of the invention is no greater than would be the case of a conventional Stretford process using a large packed tower in the absorption phase.

Cocurrent scrubbers are, of course, well known in the art and do not per se form a part of the present invention. Thus the choice of a particular scrubber design for use in the invention as well as feed rates and the like is largely dependent upon the design size and flow of the installation, power requirements and other factors well known to those skilled in the art. Good results are achieved utilizing scrubbers of the venturi type and are preferred for use in the process.

The plugging problem associated with packed towers due to sulfur deposits is eliminated by the use of the venturi scrubber although some sulfur deposits may occur in the system, such as in the line 16. However, the removal of the deposit from the lines or replacement of the lines is much easier and less costly than the high labor maintenance required with the packed tower of a conventional process. Little or no lost production time is attributed to removal of sulfur deposits in this process. In addition, in view of the short contact time in each scrubber, approximately 0.1 to 1 second per scrubber, as compared to about 30 seconds in a large packed tower, the size of the scrubber is substantially less than would be required in a packed tower to achieve an equal amount of hydrogen sulfide removal at the same gas and liquid flow.

Although venturi scrubbers require power to operate, it is believed that the power requirements are not much greater than would be required to pump washing solution to the top of a large packed tower. Thus, operational costs are not much greater than with a conventional process and considering the substantial savings in construction and maintenance costs, the process of the present invention is more economical.

As described, the clean gas has a hydrogen sulfide content of about 1 ppm. This may be sufficient to cause an odor problem. Accordingly it may be desirable to add one or more additional intermediate stages of venturi scrubbers between the first stage and final stage scrubbers. The intermediate stages serve to absorb hydrogen sulfide remaining in the gas after the first stage absorption. Preferably, however, the gas exiting from the final stage scrubber 36 is passed upwardly through a small packed tower 44 counter current to downwardly flowing washing solution to reduce the hydrogen sulfide content to about 0.1 ppm. Since the gas being treated contains a small amount of hydrogen sulfide, the size of the tower is substantially reduced (about 20 feet in height for a 12 foot diameter tower) and there is no plugging problem due to sulfur deposits.

Various embodiments and modifications of this invention have been described in the foregoing description, and further modifications will be apparent to those skilled in the art. Such modifications are included within the scope of this invention as defined by the following claim.

I claim:

1. In the process for treating a hydrogen sulfide-containing gas to convert the hydrogen sulfide to elemental sulfur in which said gas is contacted with an aqueous alkaline washing solution containing a water-soluble metal vanadate to yield an effluent gas of reduced sulfur content, the solution is thereafter regenerated by contact with an oxygen-containing gas, elemental sulfur is recovered from said solution, and said regenerated solution is recycled to said gas contacting step, the improvement which comprises:
cocurrently contacting said hydrogen sulfide-containing gas and said washing solution in a series of fluid flow connected stages including at least a primary stage and a final stage, each of said stages comprising a gas-liquid scrubber adapted for cocurrent fluid flow therethrough;
said hydrogen sulfide-containing gas being introduced at said primary stage for sequential flow through said stages to exhaust from said final stage; and
said washing solution being introduced at said final stage for sequential flow through said stages to recovery from said primary stage.

2. The process of claim 1 wherein each of said gas-liquid scrubbers is a venturi scrubber.

3. The process of claim 1 wherein said contact between said gas and said washing solution is carried out in two stages consisting of said primary stage and said final stage.

4. The process of claim 3 further including the step of passing said gas from said final stage to a packed tower for contact with said washing solution to absorb minor amounts of hydrogen sulfide therefrom.

5. The process of claim 1 further including the step of contacting said gas and said washing solution in at least one intermediate stage between said primary stage and said final stage.

6. In the process for treating hydrogen sulfide-containing hydrogenated Claus process tail gas to convert the hydrogen sulfide to elemental sulfur in which said hydrogenated Claus process tail gas is contacted with an aqueous alkaline washing solution containing a water-soluble metal vanadate to yield an effluent gas of reduced sulfur content, the solution is thereafter regenerated by contact with an oxygen-containing gas, elemental sulfur is recovered from said solution, and said regenerated solution is recycled to said gas contacting step, the improvement which comprises:
introducing said washing solution to a gas-liquid scrubber for cocurrent contact with a gaseous medium to effect the transfer of dissolved and entrained oxygen from said washing solution to said gaseous medium, said gaseous medium having a reduced hydrogen sulfide content with respect to the hydrogen sulfide content of said hydrogenated Claus process tail gas; and
introducing said washing solution after transfer of said dissolved and entrained oxygen to at least a second gas-liquid scrubber for contact with said hydrogenated Claus process tail gas to absorb said hydrogen sulfide therefrom and to initiate formation of elemental sulfur in said washing solution.

7. The process of claim 6 wherein said gaseous medium is an effluent gas of reduced hydrogen sulfide content from said at least second gas-liquid scrubber.

8. The process of claim 6 wherein hydrogen sulfide absorption from said gaseous medium occurs concurrently with said transfer of said dissolved and entrained oxygen from said washign solution to said gaseous medium.

9. In the process for treating hydrogen sulfide-containing hydrogenated Claus process tail gas in which said gas is contacted with an aqueous alkaline washing solution containing a water-soluble metal vanadate to yield an effluent gas of reduced sulfur content, the solution is thereafter regenerated by contact with an oxygen-containing gas, elemental sulfur is recovered from said solution, and said regenerated solution is recycled to said gas contacting step, the improvement with comprises:
cocurrently contacting said hydrogenated Claus process tail gas and said washing solution in a primary stage venturi scrubber and a final stage venturi scrubber, said gas flowing in series through said primary stage venturi scrubber to said final stage venturi scrubber, and said washing solution flowing in counter-series through said final stage to said primary stage scrubber.

10. The process of claim 9 further including the step of contacting said gas from said final stage venturi scrubber with said washing solution by countercurrent flow through a packed column.

* * * * *